(12) United States Patent
Nakajima

(10) Patent No.: US 11,247,511 B2
(45) Date of Patent: Feb. 15, 2022

(54) TYRE

(71) Applicant: SUMITOMO RUBBER INDUSTRIES, LTD., Hyogo (JP)

(72) Inventor: Koichi Nakajima, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 381 days.

(21) Appl. No.: 16/241,590

(22) Filed: Jan. 7, 2019

(65) Prior Publication Data

US 2019/0225023 A1 Jul. 25, 2019

(30) Foreign Application Priority Data

Jan. 23, 2018 (JP) .............................. JP2018-008978

(51) Int. Cl.
*B60C 11/03* (2006.01)
*B60C 11/13* (2006.01)
(Continued)

(52) U.S. Cl.
CPC ................ *B60C 11/03* (2013.01); *B60C 5/00* (2013.01); *B60C 11/045* (2013.01); *B60C 11/047* (2013.01); *B60C 11/1307* (2013.01); *B60C 11/1353* (2013.01); *B60C 2011/0374* (2013.01); *B60C 2011/1338* (2013.01); *B60C 2011/1361* (2013.01)

(58) Field of Classification Search
CPC ......... B60C 11/1353; B60C 2011/1361; B60C 11/13; B60C 11/1307; B60C 11/1315; B60C 11/1323; B60C 2011/133; B60C 2011/1338

See application file for complete search history.

(56) References Cited

U.S. PATENT DOCUMENTS 5,246,049 A * 9/1993 Ramcke .............. B60C 11/0309
152/209.21
6,415,835 B1 * 7/2002 Heinen ............... B60C 11/0309
152/209.21

(Continued)

FOREIGN PATENT DOCUMENTS

JP 2016-137763 A 8/2016

*Primary Examiner* — Alison L Hindenlang
*Assistant Examiner* — George W. Brady
(74) *Attorney, Agent, or Firm* — Greenblum & Bernstein, P.L.C.

(57) ABSTRACT

A circumferential groove has a groove bottom and a pair of groove walls. Groove bottom includes groove bottom protruding portions protruding radially outwardly from a groove bottom reference surface and having a first groove bottom surface extending radially. The first groove bottom surface includes a first surface portion on one side of a center line of the circumferential groove and a second surface portion positioned on the other side, and an angle between them is 20° to 170°. The groove wall includes groove wall protruding portions protruding toward an inside of the circumferential groove from a groove wall reference surface defined as a circumferential surface at a widest groove width position of the circumferential groove and having a first groove wall width surface 12 extending in a tyre width direction and a second groove wall surface having an angle larger than the first groove wall width surface.

17 Claims, 7 Drawing Sheets

(51) Int. Cl.
*B60C 11/04* (2006.01)
*B60C 5/00* (2006.01)

(56) References Cited

U.S. PATENT DOCUMENTS

2013/0333818 A1* 12/2013 Yamaguchi ........... B60C 11/042
    152/523
2018/0290500 A1* 10/2018 Yeo ..................... B60C 11/1369

* cited by examiner

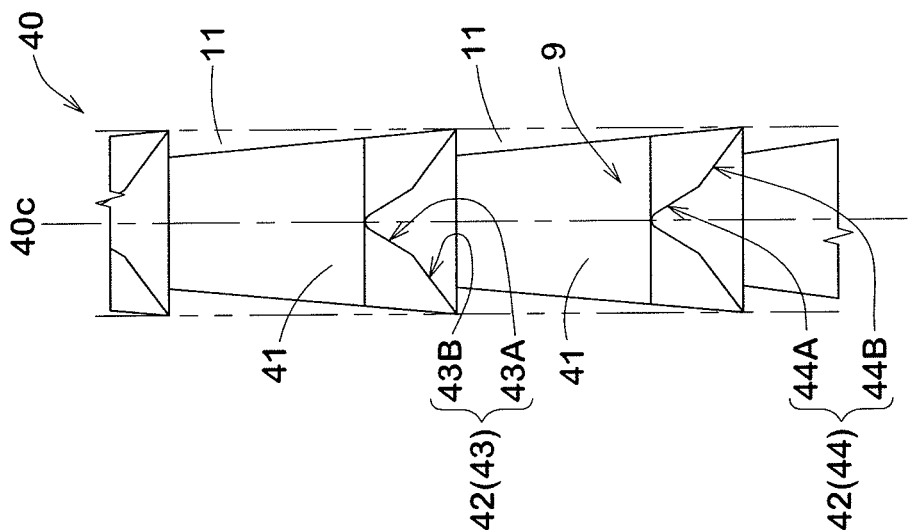
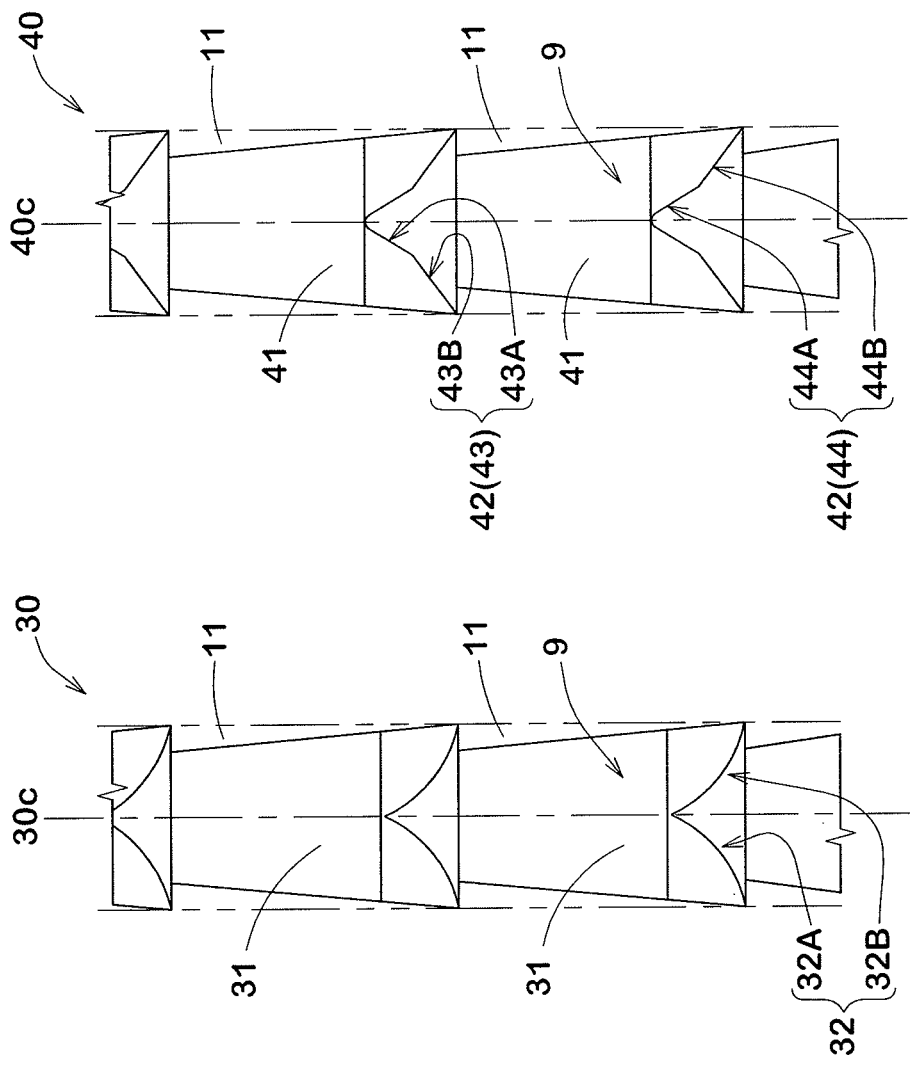
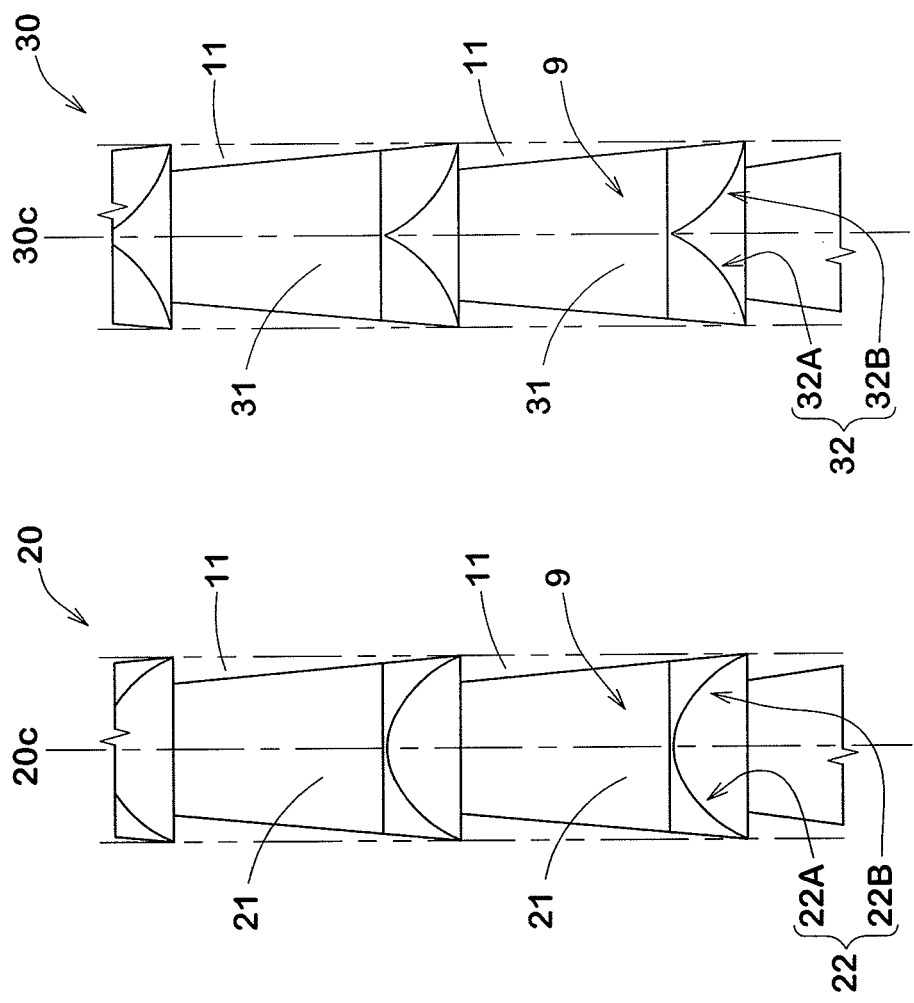

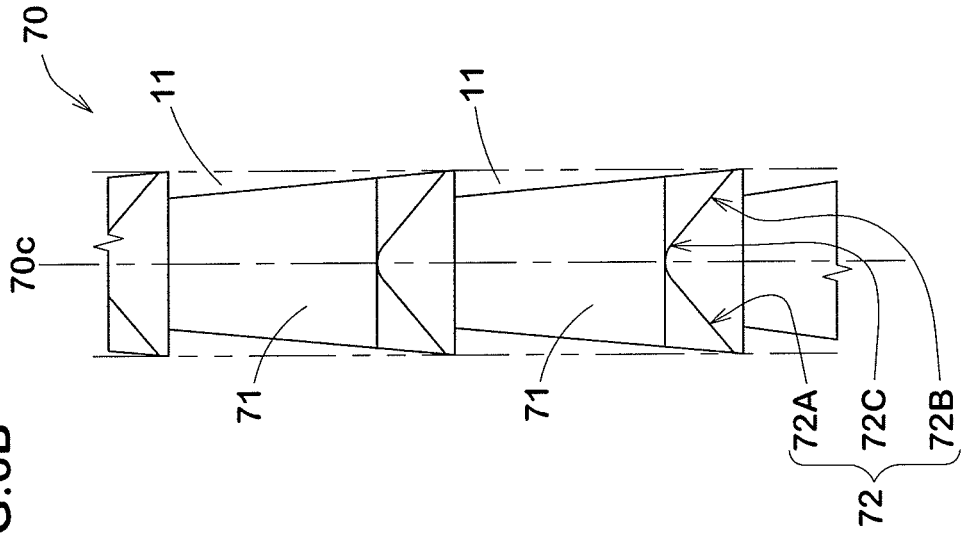
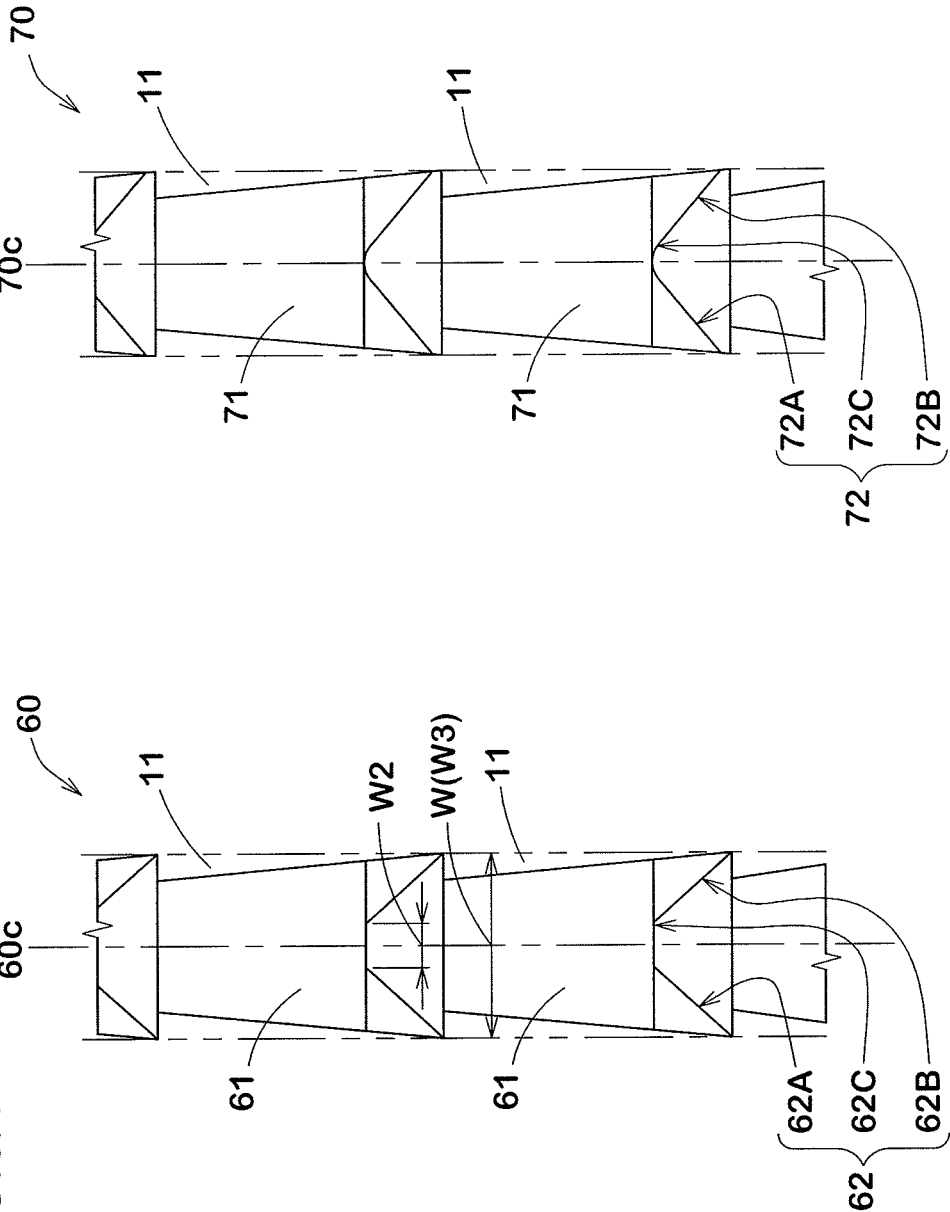

TYRE

TECHNICAL FIELD

The present invention relates to a tyre having a tread portion provided with a circumferential groove extending continuously in a tyre circumferential direction.

BACKGROUND ART

Conventionally, in order to improve on-snow performance, an attempt has been made to specify the shape of groove walls of the circumferential groove extending continuously in the tyre circumferential direction formed in the tread portion. For example, Japanese Unexamined Patent Application Publication No. 2016-137763 (Patent Literature 1) has proposed a tyre having improved on-snow performance by providing enlarged width portions in the circumferential grooves.

SUMMARY OF THE INVENTION

However, there has been a case with the tyre disclosed in Patent Literature 1 where drive power and braking force become insufficient during running on a snowy road surface depending on the use situation, therefore, there has been a demand for further improvement to maintain the on-snow performance high.

The present invention was made in view of the above, and a primary object thereof is to provide a tyre capable of improving the on-snow performance by specifying the shape of the circumferential groove.

In one aspect of the present invention, a tyre comprises a tread portion including a tread surface which is to be in contact with a ground during running, wherein the tread portion is provided with a circumferential groove extending continuously in a tyre circumferential direction, the circumferential groove has a groove bottom and a pair of groove walls extending from the groove bottom to the tread surface in a tyre radial direction, the groove bottom includes a plurality of groove bottom protruding portions protruding outwardly in the tyre radial direction from a groove bottom reference surface defined as a surface parallel to the tread surface at a deepest position of a groove depth of the circumferential groove, each of the groove bottom protruding portions has a first groove bottom surface extending in the tyre radial direction, the first groove bottom surface includes a first surface portion positioned on one side of a center line of the circumferential groove and a second surface portion positioned on the other side, an angle between the first surface portion and the second surface portion is in a range of from 20 to 170 degrees in a plan view of the tread portion, each of the groove walls includes a plurality of groove wall protruding portions each protruding toward an inside of the circumferential groove from a groove wall reference surface defined as a surface along the tyre circumferential direction at a widest position of a groove width of the circumferential groove, and each of the groove wall protruding portions has a first groove wall surface extending in a tyre width direction and a second groove wall surface having an angle with respect to the tyre width direction larger than that of the first groove wall surface.

In another aspect of the invention, it is preferred that each of the groove bottom protruding portions is formed symmetrical with respect to the center line of the circumferential groove in the plan view of the tread portion.

In another aspect of the invention, it is preferred that each of the groove bottom protruding portions has a second groove bottom surface having an angle larger than that of the first groove bottom surface with respect to the tyre radial direction.

In another aspect of the invention, it is preferred that each of the groove bottom protruding portions has a third groove bottom surface substantially parallel to the tread surface and connecting between an outer end in the tyre radial direction of the first groove bottom surface and an outer end in the tyre radial direction of the second groove bottom surface.

In another aspect of the invention, it is preferred that the first groove bottom surface includes a third surface portion positioned between the first surface portion and the second surface portion.

In another aspect of the invention, it is preferred that the third surface portion is perpendicular to the center line of the circumferential groove.

In another aspect of the invention, it is preferred that a length in the tyre width direction of the third surface portion is not more than 60% of a maximum distance in the tyre width direction between the first surface portion and the second surface portion.

In another aspect of the invention, it is preferred that the third surface portion is formed by a curved surface, a flat surface, or a combination of a curved surface and a flat surface.

In another aspect of the invention, it is preferred that the pair of the groove walls are formed symmetrical with respect to the center line of the circumferential groove in the plan view of the tread portion.

In another aspect of the invention, it is preferred that a length in the tyre width direction of each of the first groove wall surfaces is not more than 20% of an interval between the first groove wall surfaces adjacent to each other in the tyre circumferential direction.

In another aspect of the invention, it is preferred that an interval between the first groove wall surfaces adjacent to each other in the tyre circumferential direction is equal to an interval between the first groove bottom surfaces adjacent to each other in the tyre circumferential direction.

BRIEF DESCRIPTION OF THE DRAWINGS

FIG. 4A is a plan view of the circumferential groove according to another embodiment of the present invention.

FIG. 4B is a plan view of the circumferential groove according to yet another embodiment of the present invention.

FIG. 4C is a plan view of the circumferential groove according to still another embodiment of the present invention.

FIG. 6A is a plan view of the circumferential groove according to yet further another embodiment of the present invention.

FIG. 6B is a plan view of the circumferential groove according to still further another embodiment of the present invention.

DESCRIPTION OF THE PREFERRED EMBODIMENT

An embodiment of the present invention will now be described below in detail in conjunction with accompanying drawings.

Figure 1:
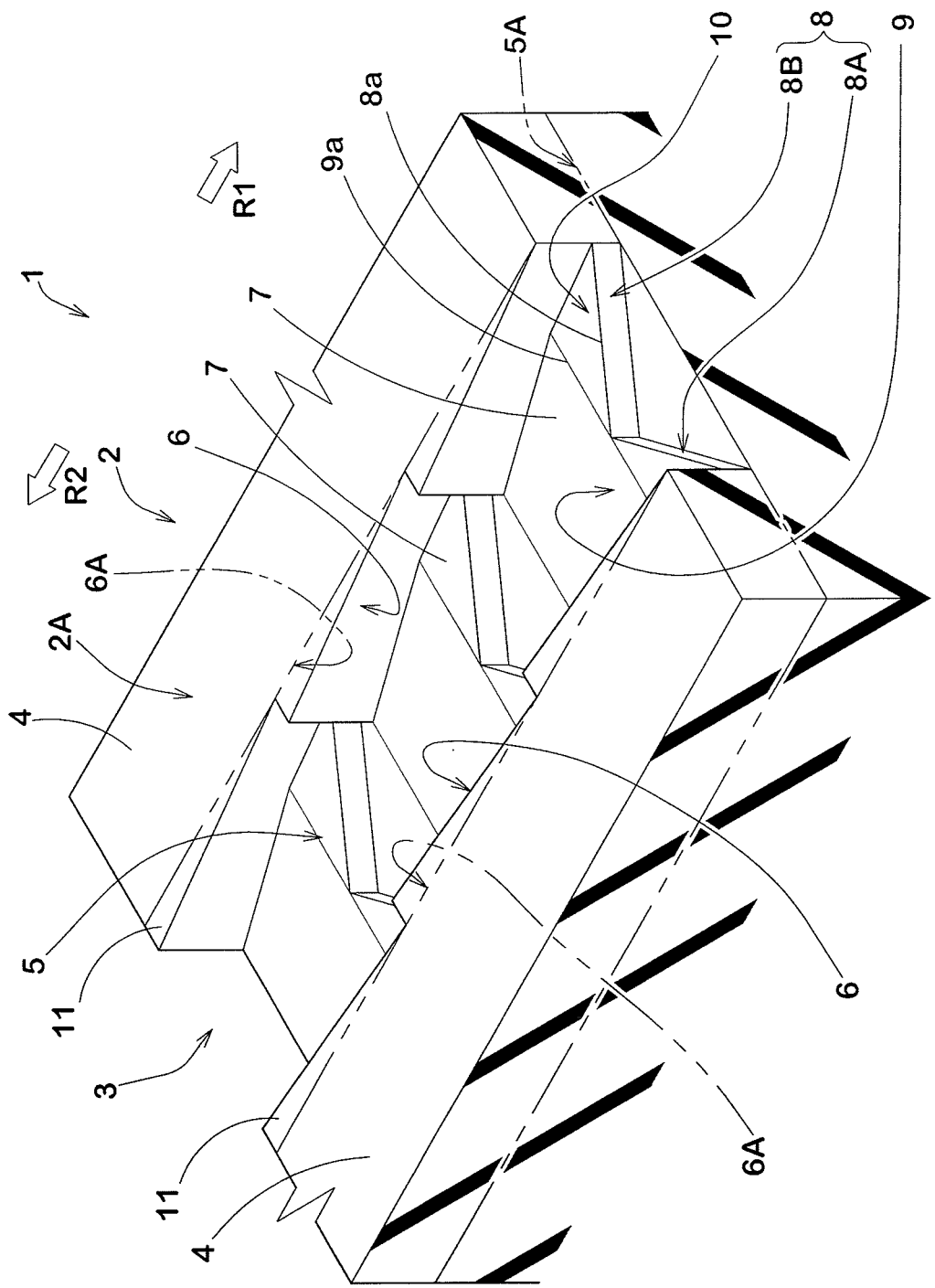
FIG. 1 is a perspective view of a circumferential groove of a tyre according to an embodiment of the present invention.

FIG. 1 is a perspective view of a circumferential groove 3 of a tyre 1 in this embodiment. As shown in FIG. 1, the tyre 1 in this embodiment has a tread portion 2 including a tread surface (2A) which is to be in contact with a road surface during running. The tyre 1 in this embodiment is suitably used as a winter tyre. Here, the winter tyre means a tyre suitable for running on a snowy road surface including a studless tyre, a snow tyre, and an all season tyre.

The tread portion 2 in this embodiment includes at least one circumferential groove 3 extending continuously in the tyre circumferential direction and a plurality of land regions 4 divided by the circumferential groove 3.

Figure 2:
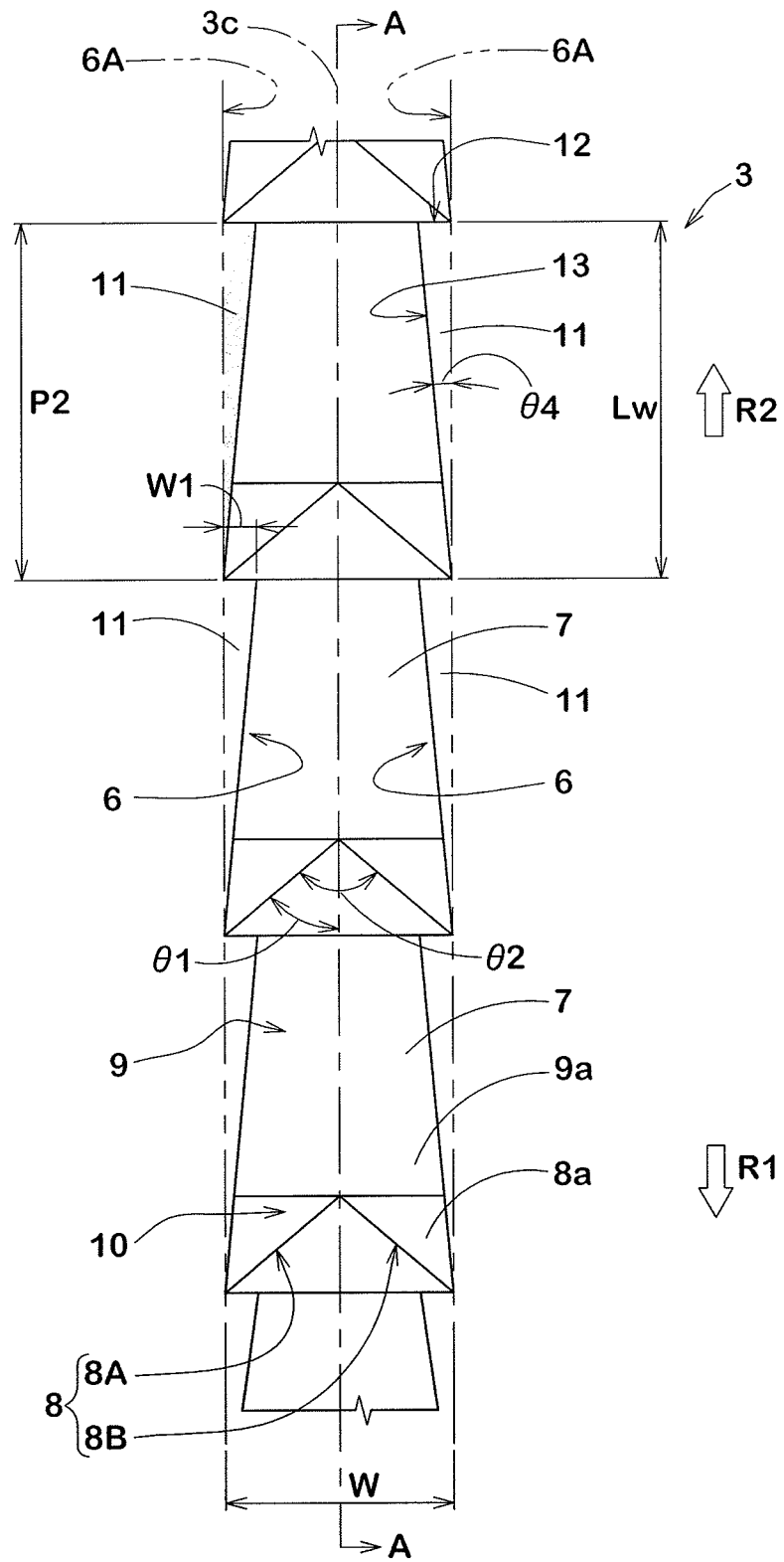
FIG. 2 is a plan view of the circumferential groove of FIG. 1.
Figure 3:
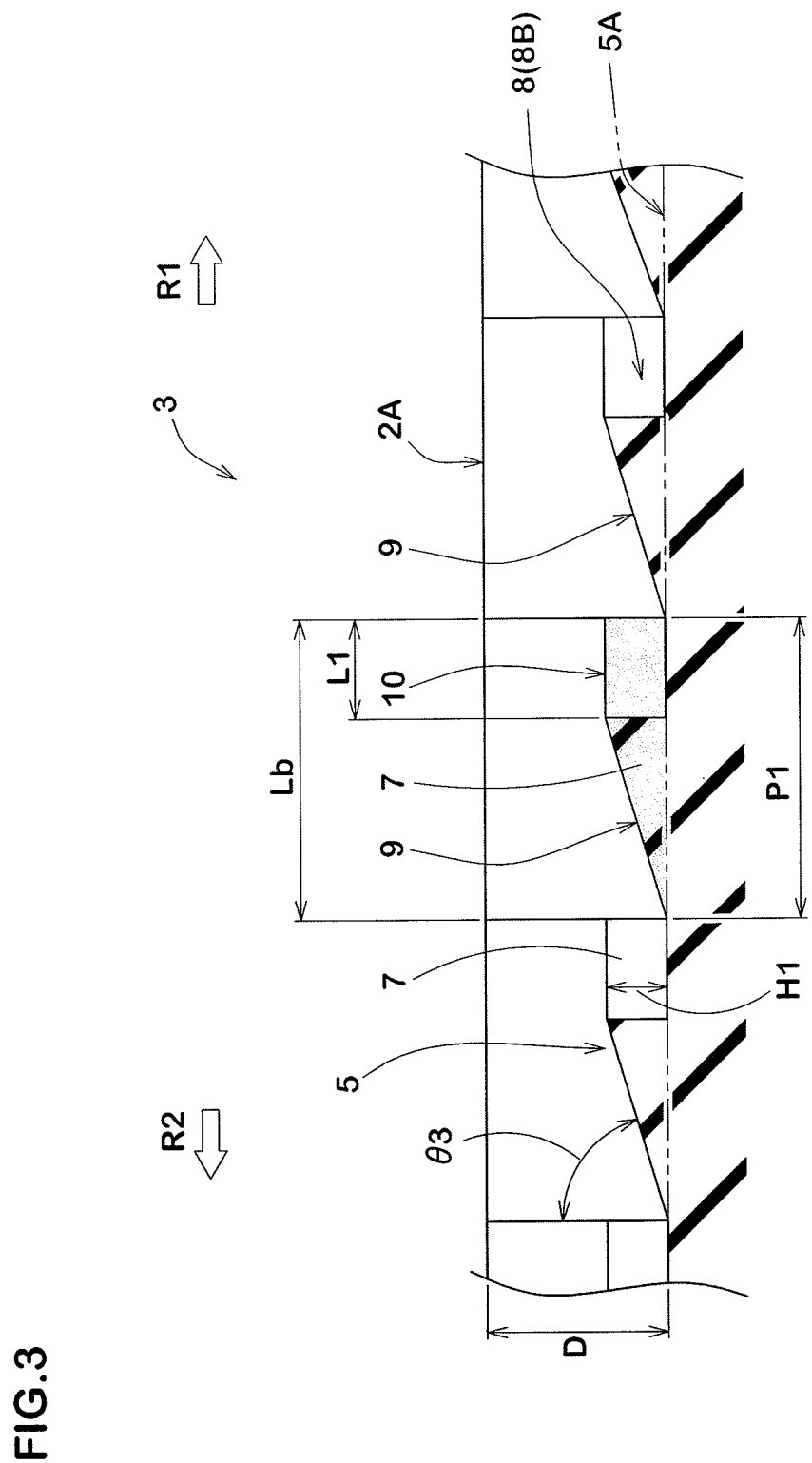
FIG. 3 is a cross-sectional view taken along A-A line of FIG. 2.

FIG. 2 is a plan view of the circumferential groove 3, and FIG. 3 is a cross-sectional view taken along A-A line of FIG. 2. As shown in FIGS. 1 to 3, the circumferential groove 3 in this embodiment has a groove bottom 5 and a pair of groove walls 6 each extending from the groove bottom 5 toward the tread surface (2A) in a tyre radial direction. Here, in this specification, "extending in a direction" means containing a lot of components in that direction.

The groove bottom 5 includes a plurality of groove bottom protruding portions 7 each protruding outwardly in the tyre radial direction from a groove bottom reference surface (5A) defined as a surface parallel to the tread surface (2A) at a deepest position of a groove depth (D) of the circumferential groove 3. In FIG. 3, for ease of understanding, one of the groove bottom protruding portions 7 is shaded.

In the circumferential groove 3 configured as such, the groove bottom protruding portions 7 stick themselves into the snow, therefore, it is possible that excellent on-snow performance is maintained. Thereby, it is possible that the tyre 1 in this embodiment maintains good on-snow performance even when the tyre 1 is worn. Further, the groove bottom protruding portions 7 configured as such disturb vibration in an air column of the circumferential groove 3, therefore, it is possible that air column resonance sound during running is decreased, thereby, it is possible that noise performance of the tyre 1 is improved.

Each of the groove bottom protruding portions 7 in this embodiment has a first groove bottom surface 8 extending in the tyre radial direction.

As shown in FIG. 2, it is preferred that each of the first groove bottom surfaces 8 includes a first surface portion (8A) having an angle θ1 in the range of from 10 to 85 degrees with respect to a center line (3c) of the circumferential groove 3 in a plan view of the tread portion. With the groove bottom protruding portions 7 configured as such, when the tyre 1 is rotated in a first rotational direction (R1) in which an opening side of the groove bottom protruding portions 7 is a heel side, snow moves along the first surface portions (8A), therefore, the condensation of the snow is promoted, thereby, it is possible that snow shearing force is improved even when the tyre 1 is worn. The opening side of each of the groove bottom protruding portions 7 is a wider side of a space between the first surface portion and the center line.

As shown in FIGS. 1 and 2, each of the groove walls 6 in this embodiment includes a plurality of groove wall protruding portions 11 each protruding toward an inside, that is toward the center line, of the circumferential groove 3 from a groove wall reference surface (6A) defined as a surface along the tyre circumferential direction at the widest position of a groove width (W) of the circumferential groove 3. In FIG. 2, for ease of understanding, one of the groove wall protruding portions 11 is shaded. Here, in this specification, "along a direction" means "parallel to the direction".

In the circumferential groove 3 configured as such, the groove wall protruding portions 11 stick themselves into the snow, therefore, it is possible that the on-snow performance is improved. Further, the groove wall protruding portions 11 configured as such disturb the vibration in the air column of the circumferential groove 3, therefore, it is possible that the air column resonance sound during running is decreased, thereby, it is possible that the noise performance of the tyre 1 is improved.

Each of the groove wall protruding portions 11 has a first groove wall surface 12 extending in a tyre width direction and a second groove wall surface 13 having an angle with respect to the tyre width direction larger than that of the first groove wall surface 12. In the groove walls 6 configured as such, edge components in the tyre width direction are increased by the first groove wall surfaces 12, therefore, it is possible that the drive power and the braking force during running on a snowy road surface are improved. Further, when the tyre 1 is rotated in the first rotational direction (R1) in which an opening side of the groove wall protruding portions 11 is the heel side, the snow moves along the second groove wall surfaces 13, therefore, the condensation of the snow is promoted, thereby, it is possible that the snow shearing force is improved. The opening side of the groove wall protruding portions 11 is a wider side in the tyre width direction between each pair of the groove wall protruding portions 11 adjacent to each other in the tyre width direction. Thereby, in the tyre 1 in this embodiment, the groove bottom protruding portions 7 stick themselves into the snow condensed by the groove walls 6, therefore, it is possible that the on-snow performance is further improved. Furthermore, in the circumferential groove 3 configured as such, a snow discharging effect is improved by deformation of the groove bottom protruding portions 7 and the groove wall protruding portions 11 at the time of the tread surface (2A) contacting the ground and leaving the ground, therefore, it is possible that the on-snow performance is further improved.

It is possible that the tyre 1 having the circumferential groove 3 described above maintains good on-snow performance by specifying the shapes of the groove bottom 5 and the groove walls 6 regardless of whether the tyre 1 is worn or not worn. More preferred shapes of the groove bottoms 5 and the groove walls 6 will be described below.

As shown in FIG. 2, each of the groove bottom protruding portions 7 in this embodiment is formed to be symmetrical with respect to the center line (3c) of the circumferential groove 3 in a plan view of the tread portion. In the circumferential groove 3, the center line (3c) in a groove width direction thereof extends along the tyre circumferential direction, for example. It is preferred that the groove bottom protruding portions 7 are formed over the entire width in the tyre width direction of the circumferential groove 3.

Each of the first groove bottom surfaces 8 includes the first surface portion (8A) positioned on one side of the center line (3c) of the circumferential groove 3 and a second surface portion (8B) positioned on the other side, for example. Each of the first surface portions (8A) and the second surface portions (8B) is formed by a flat surface.

In each of the first groove bottom surfaces, it is preferred that an angle θ2 between the first surface portion (8A) and the second surface portion (8B) is in the range of from 20 to 170 degrees in the plan view of the tread portion. With the groove bottom protruding portions 7 configured as such, when the tyre 1 is rotated in the first rotational direction (R1) in which the opening side of the groove bottom protruding portions 7 is the heel side, snow moves along the first surface portions (8A) and the second surface portion (8B), therefore, the condensation of the snow is promoted, thereby, it is possible that snow shearing force is improved even when the tyre 1 is worn. The opening side of the groove bottom protruding portions 7 may also be defined as a wider side between the first surface portion 8A and the second surface portion 8B in each of the first groove bottom surfaces 8.

As shown in FIG. 3, it is preferred that a height (H1) in the tyre radial direction of each of the first groove bottom surfaces 8 is not less than 1 mm. Further, it is preferred that the height (H1) of each of the first groove bottom surfaces 8 is smaller than a height, from the groove bottom reference surface (5A), of a tread wear indicator (not shown) indicating a wear limit of the tyre 1. In the groove bottom protruding portions 7 having the first groove bottom surfaces 8 configured as such, the first groove bottom surfaces 8 certainly stick themselves into the snow even when the tyre 1 is used up to the wear limit, therefore, it is possible that good on-snow performance is maintained.

It is preferred that an interval (P1) between the first groove bottom surfaces 8 adjacent to each other in the tyre circumferential direction is in the range of from 10 to 15 mm. In the groove bottom protruding portions 7 having the first groove bottom surfaces 8 configured as such, the first groove bottom surfaces 8 appropriately stick themselves into the snow, therefore, it is possible that the on-snow performance is improved.

Each of the groove bottom protruding portions 7 has a second groove bottom surface 9 having an angle with respect to the tyre radial direction larger than that of each of the first groove bottom surfaces 8, for example. Each of the groove bottom protruding portions 7 in this embodiment further has a third groove bottom surface 10 substantially parallel to the tread surface (2A) and connecting between an outer end (8a) in the tyre radial direction of a respective one of the first groove bottom surfaces 8 and an outer end (9a) in the tyre radial direction of a respective one of the second groove bottom surfaces 9. In this specification, the expression "substantially parallel" includes precisely parallel and inclined at an angle within ±5 degrees with respect to parallel.

It is preferred that each of the second groove bottom surfaces 9 has an angle θ3 in the range of from 70 to 87 degrees with respect to the tyre radial direction. With the second groove bottom surfaces 9 configured as such, when the tyre 1 is rotated in a second rotational direction (R2), snow moves along the second groove bottom surfaces 9, therefore, condensation of the snow is promoted, thereby, it is possible that the snow shearing force is improved.

It is preferred that a length (L1) of each of the third groove bottom surfaces 10 is not less than 10% of the interval (P1) between the first groove bottom surfaces 8 adjacent to each other in the tyre circumferential direction. With the third groove bottom surfaces 10 configured as such, the condensation of the snow is promoted, thereby, it is possible that the snow shearing force is improved and that strength of the groove bottom protruding portions 7 is increased.

A length (Lb) in the tyre circumferential direction of each of the groove bottom protruding portions 7 in this embodiment is substantially equal to the interval (P1) between the first groove bottom surfaces 8 adjacent to each other in the tyre circumferential direction. Thereby, it is preferred that the length (L1) in the tyre circumferential direction of each of the third groove bottom surfaces 10 is not less than 10% of the length (Lb) in the tyre circumferential direction of each of the groove bottom protruding portions 7. Note that the length (Lb) of each of the groove bottom protruding portions 7 may be smaller than the interval (P1) between the first groove bottom surfaces 8 adjacent to each other in the tyre circumferential direction.

As shown in FIG. 2, it is preferred that the pair of the groove walls 6 is formed symmetrically with respect to the center line (3c) of the circumferential groove 3 in the plan view of the tread portion. That is, each of the groove wall protruding portions 11 formed in one of the groove walls 6 is located at the same position in the tyre circumferential direction as a respective one of the groove wall protruding portions 11 formed in the other one of the groove walls 6. Each of the first groove wall surfaces 12 and the second groove wall surfaces 13 in this embodiment is formed by a flat surface. In the groove walls 6 configured as such, the condensation of the snow is further promoted by the second groove wall surfaces 13, therefore, it is possible that the snow shearing force is further improved.

It is preferred that a length W1 in the tyre width direction of each of the first groove wall surfaces 12 is not less than 1 mm. If the length W1 of each of the first groove wall surfaces 12 is less than 1 mm, it is possible that the snow condensation effect by the second groove wall surfaces 13 is decreased.

It is preferred that the length W1 in the tyre width direction of each of the first groove wall surfaces 12 is not more than 20% of an interval (P2) between the first groove wall surfaces 12 adjacent to each other in the tyre circumferential direction. It is preferred that the interval (P2) between the first groove wall surfaces 12 adjacent to each other in the tyre circumferential direction is equal to the interval (P1) between the first groove bottom surfaces 8 adjacent to each other in the tyre circumferential direction. With the circumferential groove 3 configured as such, it is possible that the snow discharging effect by the deformation of the groove bottom protruding portions 7 and the groove wall protruding portions 11 at the time of the tread surface (2A) contacting the ground and leaving the ground is further improved.

A length (Lw) in the tyre circumferential direction of each of the groove wall protruding portions 11 in this embodiment is substantially equal to the interval (P2) between the first groove wall surfaces 12 adjacent to each other in the tyre circumferential direction. Thereby, it is preferred that the length W1 in the tyre width direction of each of the first groove wall surfaces 12 is not more than 20% of the length (Lw) in the tyre circumferential direction of each of the groove wall protruding portions 11. It is possible that the groove wall protruding portions 11 having the first groove wall surfaces 12 configured as such stick themselves into snow at appropriate pitches, therefore, it is possible that the on-snow performance is stably exerted. Note that the length (Lw) of each of the groove wall protruding portions 11 may be smaller than the interval (P2) between the first groove wall surfaces 12 adjacent to each other in the tyre circumferential direction.

It is preferred that each of the second groove wall surfaces 13 has an θ4 in the range of from 3 to 20 degrees with respect to the tyre circumferential direction in the plan view of the tread portion. With the second groove wall surfaces 13 configured as such, when the tyre 1 is rotated in the first rotational direction (R1) in which the opening sides of the groove bottom protruding portions 7 and the groove wall protruding portions 11 are the heel side, the condensation of the snow is promoted, thereby, it is possible that the snow shearing force is improved.

FIGS. 4A, 4B, and 4c are plan views of circumferential grooves 20, 30, and 40, respectively, according to other embodiments. The same reference numerals are given to the elements common to the embodiment described above, and the explanations thereof are omitted.

FIG. 4A shows the circumferential groove 20 in which each of first groove bottom surfaces 22 of groove bottom protruding portions 21 is formed by a curved surface. As shown in FIG. 4A, the circumferential groove 20 in this embodiment includes a plurality of the groove bottom protruding portions 21 and a plurality of the groove wall protruding portions 11. Each of the groove bottom protruding portions 21 in this embodiment has one of the first groove bottom surfaces 22 extending in the tyre radial direction and its adjacent one of the second groove bottom surfaces 9 having an angle larger than that of the first groove bottom surface 22 with respect to the tyre radial direction.

Each of the first groove bottom surfaces 22 includes a first surface portion (22A) positioned on one side of a center line (20c) of the circumferential groove 20 and a second surface portion (22B) positioned on the other side, for example. Each of the first surface portions (22A) and the second surface portions (22B) in this embodiment is formed by a curved surface concave toward a respective one of the second groove bottom surfaces 9. With the groove bottom protruding portions 21 configured as such, it is possible that the snow is condensed along the curved surfaces of the first groove bottom surfaces 22, therefore, it is possible that the snow shearing force is improved.

FIG. 4B shows the circumferential groove 30 in which each of first groove bottom surfaces 32 of groove bottom protruding portions 31 is formed by a curved surface. As shown in FIG. 4B, the circumferential groove 30 in this embodiment includes a plurality of the groove bottom protruding portions 31 and a plurality of the groove wall protruding portions 11. Each of the groove bottom protruding portions 31 in this embodiment has one of the first groove bottom surfaces 32 extending in the tyre radial direction and its adjacent one of the second groove bottom surfaces 9 having an angle larger than that of the first groove bottom surface 32 with respect to the tyre radial direction.

Each of the first groove bottom surfaces 32 includes a first surface portion (32A) positioned on one side of a center line (30c) of the circumferential groove 30 and a second surface portion (32B) positioned on the other side, for example. Each of the first surface portions (32A) and the second surface portions (32B) in this embodiment is formed by a curved surface convex toward a direction opposite to a respective one of the second groove bottom surfaces 9. With the groove bottom protruding portions 31 configured as such, it is possible that the snow is condensed along the curved surfaces of the first groove bottom surfaces 32, therefore, it is possible that the snow shearing force is improved.

FIG. 4c shows the circumferential groove 40 in which each of first groove bottom surfaces 42 of groove bottom protruding portions 41 is formed by two flat surfaces having different angles from each other with respect to the tyre width direction. As shown in FIG. 4c, the circumferential groove 40 in this embodiment includes a plurality of the groove bottom protruding portions 41 and a plurality of the groove wall protruding portions 11. Each of the groove bottom protruding portions 41 in this embodiment has one of the first groove bottom surfaces 42 extending in the tyre radial direction.

Each of the first groove bottom surfaces 42 includes a first surface portion 43 positioned on one side of a center line (40c) of the circumferential groove 40 and a second surface portion 44 positioned on the other side, for example. It is preferred that each of the first surface portion 43 and the second surface portions 44 is formed by two flat surfaces having different angles with respect to the tyre width direction.

The first surface portion 43 includes an inner first surface portion (43A) positioned on a side of the center line (40c) of the circumferential groove 40 and an outer first surface portion (43B) positioned on an outer side of the inner first surface portion (43A) and having a smaller angle than that of the inner first surface portion (43A) with respect to the tyre width direction, for example. Although not shown in the figure, the angle of the outer first surface portion (43B) with respect to the tyre width direction may be larger than the angle of the inner first surface portion (43A) with respect to the tyre width direction.

The second surface portion 44 includes an inner second surface portion (44A) positioned on the side of the center line (40c) of the circumferential groove 40 and an outer second surface portion (448) positioned on the outer side of the inner second surface portion (44A) and having a smaller angle than that of the inner second surface portion (44A) with respect to the tyre width direction, for example. Although not shown in the figure, the angle of the outer second surface portion (44B) with respect to the tyre width direction may be larger than the angle of the inner second surface portion (44A) with respect to the tyre width direction.

With the groove bottom protruding portions 41 configured as such, it is possible that the snow is condensed along the outer first surface portions (43B) and the inner first surface portions (43A) of the first groove bottom surfaces 42 and the outer second surface portions (448) and the inner second surface portions (44A), therefore, it is possible that the snow shearing force is improved.

Figure 5:
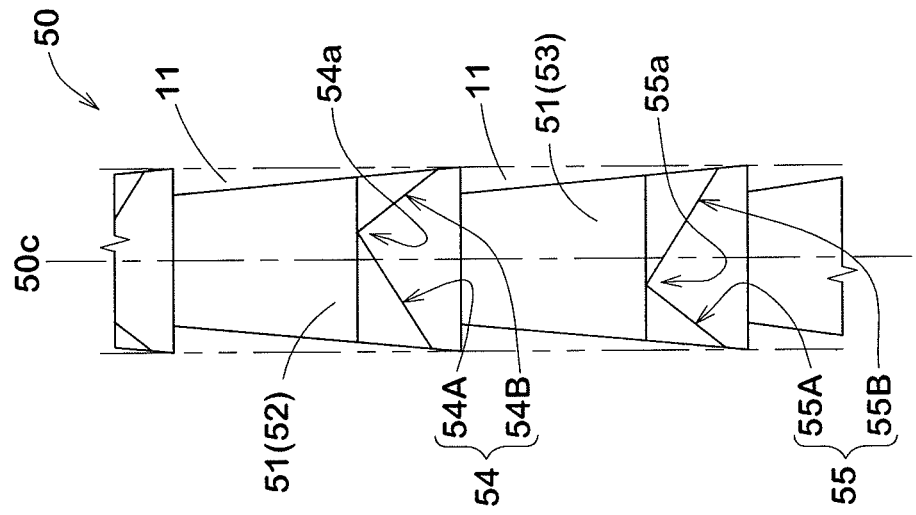
FIG. 5 is a plan view of the circumferential groove according to further another embodiment of the present invention.

FIG. 5 is a plan view of a circumferential groove 50 according to yet another embodiment. The same reference numerals are given to the elements common to the embodiments described above, and the explanations thereof are omitted.

FIG. 5 shows the circumferential groove 50 having groove bottom protruding portions 51 each not symmetrical with respect to a center line (50c) of the circumferential groove 50. As shown in FIG. 5, the circumferential groove 50 in this embodiment includes a plurality of the groove bottom protruding portions 51 and a plurality of the groove wall protruding portions 11. Each of the groove bottom protruding portions 51 in this embodiment has a first groove bottom protruding portion 52 and a second groove bottom protruding portion 53.

Each of the first groove bottom protruding portions 52 has a symmetrical shape to each of the second groove bottom protruding portions 53 with respect to the center line (50c) of the circumferential groove 50, for example. It is preferred that the first groove bottom protruding portions 52 and the second groove bottom protruding portions 53 are arranged alternately in the tyre circumferential direction.

Each of the first groove bottom protruding portions 52 in this embodiment has a first first groove bottom surface 54 extending in the tyre radial direction. The first first groove bottom surface 54 includes a first first surface portion (54A) extending from one side of the center line (50c) of the circumferential groove 50 so as to cross beyond the center line (50c) and a first second surface portion (54B) positioned on the other side of the center line (50c), for example. Thereby, an intersection portion (54a) between the first first surface portion (54A) and the first second surface portion (54B) is positioned on the other side of the center line (50c) of the circumferential groove 50.

Each of the second groove bottom protruding portion 53 in this embodiment has a second first groove bottom surface 55 extending in the tyre radial direction. The second first groove bottom surface 55 includes a second first surface portion (55A) positioned on the one side of the center line (50c) of the circumferential groove 50 and a second second surface portion (55B) extending from the other side of the center line (50c) so as to cross beyond the center line (50c), for example. Thereby, an intersection portion (55a) between the second first surface portion (55A) and the second second surface portion (55B) is positioned on the one side of the center line (50c) of the circumferential groove 50.

In the groove bottom protruding portions 51 configured as such, the first groove bottom protruding portion 52 and the second groove bottom protruding portion 53 alternately stick themselves into the snow, therefore, it is possible that the on-snow performance is improved. Note that the groove bottom protruding portions 51 may be formed only by the first groove bottom protruding portions 52, for example.

FIGS. 6A and 6B are plan views of circumferential grooves 60 and 70, respectively, according to further other embodiments. The same reference numerals are given to the elements common to the embodiments described above, and the explanations thereof are omitted.

FIG. 6A shows the circumferential groove 60 in which a first groove bottom surface 62 of each of groove bottom protruding portions 61 includes a third surface portion (62C). As shown in FIG. 6A, the circumferential groove 60 in this embodiment includes a plurality of the groove bottom protruding portions 61 and a plurality of the groove wall protruding portions 11. Each of the groove bottom protruding portions 61 in this embodiment has a first groove bottom surface 62 extending in the tyre radial direction.

Each of the first groove bottom surfaces 62 includes a first surface portion (62A) positioned on one side of a center line (60c) of the circumferential groove 60, a second surface portion (62B) positioned on the other side, and the third surface portion (62C) positioned between the first surface portion (62A) and the second surface portion (62B), for example. The third surface portion (62C) is perpendicular to the center line (60c), for example. Each of the first surface portion (62A), the second surface portion (62B), and the third surface portion (62c) is formed by a flat surface.

It is preferred that a length (W2) in the tyre width direction of the third surface portion (62C) is not more than 60% of a maximum distance (W3) in the tyre width direction between the first surface portion (62A) and the second surface portion (62B). The maximum distance (W3) between the first surface portion (62A) and the second surface portion (62B) in this embodiment is substantially equal to the maximum value of the groove width (W) of the circumferential groove 60. With the groove bottom protruding portions 61 configured as such, the snow is condensed along the first surface portions (62A) and the second surface portions (62B) and the edge components in the tyre width direction are increased by the third surface portions (62c), therefore, it is possible that the on-snow performance is improved. Note that the maximum distance (W3) between the first surface portion (62A) and the second surface portion (62B) may be smaller than the maximum value of the groove width (W).

FIG. 6B shows the circumferential groove 70 in which a first groove bottom surface 72 of each of the groove bottom protruding portions 71 includes a third surface portion (72c). As shown in FIG. 6B, the circumferential groove 70 in this embodiment includes a plurality of the groove bottom protruding portions 71 and a plurality of the groove wall protruding portions 11. Each of the groove bottom protruding portions 71 in this embodiment has the first groove bottom surface 72 extending in the tyre radial direction.

Each of the first groove bottom surfaces 72 includes a first surface portion (72A) positioned on one side of a center line (70c) of the circumferential groove 60, a second surface portion (72B) positioned on the other side, and the third surface portion (72c) positioned between the first surface portion (72A) and the second surface portion (72B), for example.

Each of the first surface portions (72A) and the second surface portions (72B) in this embodiment is formed by a flat surface. Further, the third surface portion (72C) in this embodiment is formed by a curved surface. It is preferred that the first surface portions (72A) and the third surface portion (72C) are connected smoothly. Furthermore, it is preferred that the second surface portion (72B) and the third surface portion (72C) are connected smoothly.

With the groove bottom protruding portions 71 configured as such, the snow is condensed along the first surface portions (72A) and the second surface portions (72B) and the edge components in the tyre width direction are increased by the third surface portions (72C), therefore, it is possible that the on-snow performance is improved. Note that each of the third surface portions (72C) may be configured by a combination of a curved surface and a flat surface.

Figure 7B:
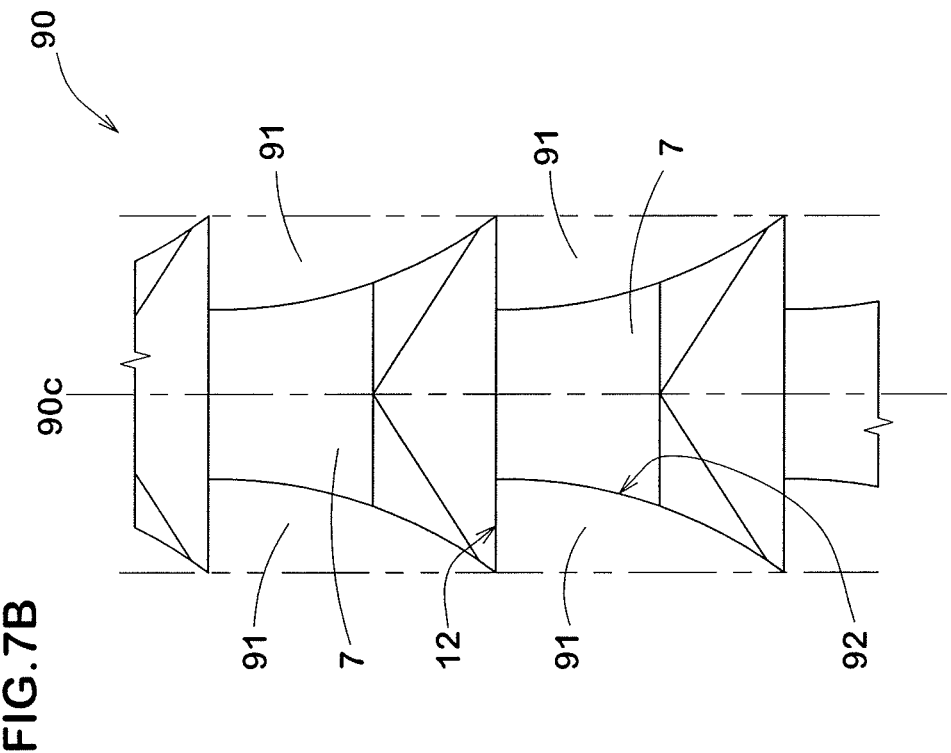
FIG. 7B is a plan view of the circumferential groove according to yet still furthermore another embodiment of the present invention.
Figure 7A:
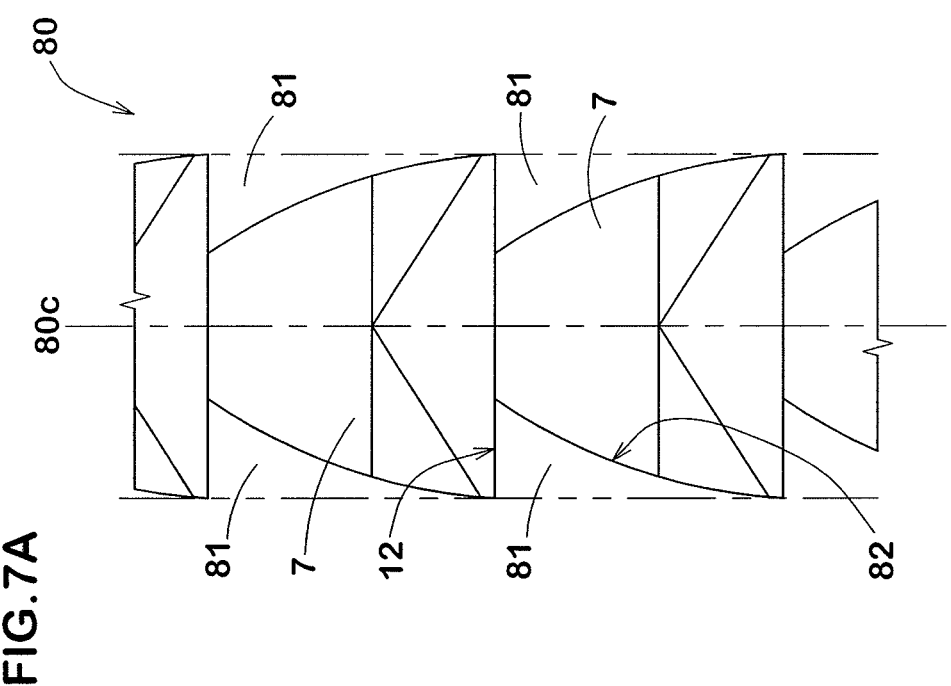
FIG. 7A is a plan view of the circumferential groove according to yet still further another embodiment of the present invention.

FIGS. 7A and 7B are plan views of circumferential grooves 80 and 90, respectively, according to yet further other embodiments. The same reference numerals are given to the elements common to the embodiments described above, and the explanations thereof are omitted.

FIG. 7A shows the circumferential groove 80 in which each of second groove wall surfaces 82 of groove wall protruding portions 81 is formed by a curved surface. As shown in FIG. 7A, the circumferential groove 80 in this embodiment includes a plurality of the groove bottom protruding portions 7 and a plurality of the groove wall protruding portions 81. Each of the groove wall protruding portions 81 in this embodiment has the first groove wall surface 12 extending in the tyre width direction and the second groove wall surfaces 82 having an angle with respect to the tyre width direction larger than that of the first groove wall surface 12.

Each of the second groove wall surfaces 82 in this embodiment is formed by a curved surface concave toward the outer side in the tyre width direction of the circumferential groove 80. With the groove wall protruding portions 81 configured as such, it is possible that the snow is condensed along the curved surfaces of the second groove wall surfaces 82, therefore, it is possible that the snow shearing force is improved.

FIG. 7B shows the circumferential groove 90 in which each of second groove wall surfaces 92 of groove wall protruding portions 91 is formed by a curved surface. As shown in FIG. 7B, the circumferential groove 90 in this embodiment includes a plurality of the groove bottom protruding portions 7 and a plurality of the groove wall protruding portions 91. Each of the groove wall protruding portions 91 in this embodiment has the first groove wall surface 12 extending in the tyre width direction and the second groove wall surface 92 having an angle with respect to the tyre width direction larger than that of the first groove wall surface 12.

Each of the second groove wall surfaces 92 in this embodiment is formed by a curved surface convex toward the inner side in the tyre width direction of the circumferential groove 90. With the groove wall protruding portions 91 configured as such, it is possible that the snow is condensed along the curved surfaces of the second groove wall surfaces 92, therefore, it is possible that the snow shearing force is improved.

While detailed description has been made of the tyres as especially preferred embodiments of the present invention, the present invention can be embodied in various forms without being limited to the illustrated embodiments.

Working Examples (Examples)

Tyres as Examples provided with the circumferential groove(s) having the groove bottom protruding portions and the groove wall protruding portions shown in FIG. 1, tyres as Conventional Example provided with the circumferential groove(s) not having the groove bottom protruding portions and the groove wall protruding portions, and tyres as References provided with the circumferential groove(s) having only the groove wall protruding portions were made by way of test. These test tyres (unused) and the test tyres worn up to 50% of the wear limit were respectively mounted on a test car, and then they were tested for driving performance and braking performance during running on a snowy road surface. Further, the test tyres were tested for the noise performance during running on a dry road surface.

Regarding the References and the Examples, Reference 1 and Example 1 were tested such that they were rotated in a direction in which the opening sides of the groove bottom protruding portions and the groove wall protruding portions were the heel side, and Reference 2 and Example 2 were tested such that they were rotated in the opposite direction. Common specifications of each of the test tyres and the test methods were as follows.

Test car: mid-size passenger car
Tyre size: 255/55R17
Tyre rim size: 17×73
Tyre inner pressure: 230 kPa <Driving Performance and Driving Performance when Worn>

While the test car with the test tyres mounted on all wheels thereof was driven on a road covered with compacted snow, the driving performance was evaluated by feeling of the driver having the evaluation skills. The results are indicated by an index each based on the Conventional Example being 100, wherein the larger the numerical value, the better the driving performance is.

<Braking Performance and Braking Performance when Worn>

While the test car with the test tyres mounted on all the wheels thereof was driven on a road covered with compacted snow, the braking performance was evaluated by the feeling of the driver having the evaluation skills. The results are indicated by an index each based on the Conventional Example being 100, wherein the larger the numerical value, the better the braking performance is.

<Noise Performance>

In-car noise was measured by using a microphone while the test car with the test tyres mounted on all the wheels thereof was driven on a road for measuring road noise at a speed of 80 km/h. The in-car noise was measured in the vicinity of the position of the driver's ear on the window side and the sound pressure level of the peak value in the narrow band around 1 KHz was evaluated. The results are indicated by an index each based on the Conventional Example being 100, wherein the smaller the numerical value, the better the noise performance is.

The test results are shown in Table 1.

TABLE 1

|  | Conventional Example | Reference 1 | Reference 2 | Example 1 | Example 2 |
| --- | --- | --- | --- | --- | --- |
| Driving performance [index] | 100 | 110 | 103 | 113 | 117 |
| Braking performance [index] | 100 | 103 | 110 | 117 | 113 |
| Driving performance when worn [index] | 100 | 130 | 110 | 140 | 150 |
| Braking performance when worn [index] | 100 | 110 | 130 | 150 | 140 |
| Noise performance [index] | 100 | 97 | 97 | 97 | 97 |

From the test results, as compared with the Conventional Example and the References, it was confirmed that the tyres as the Examples were excellent in the driving performance and the braking performance during running on a snowy road surface and that they maintained good on-snow performance even when the tyres were worn. Further, as compared with the tyres as the Conventional Example and the References, it was confirmed that the tyres as the Examples had excellent noise performance during running on a dry road surface and decreased air column resonance sound during running.

The invention claimed is:

1. A tyre comprising a tread portion including a tread surface which is to be in contact with a ground during running, wherein
the tread portion is provided with a circumferential groove extending continuously in a tyre circumferential direction,
the circumferential groove has a groove bottom and a pair of groove walls extending from the groove bottom to the tread surface in a tyre radial direction, the groove bottom includes a plurality of groove bottom protruding portions protruding outwardly in the tyre radial direction from a groove bottom reference surface defined as a surface parallel to the tread surface at a deepest position of a groove depth of the circumferential groove, each of the groove bottom protruding portions has a first groove bottom surface extending in the tyre radial direction, the first groove bottom surface includes a first surface portion positioned on one side in a width direction of the circumferential groove of a width-wise center line of the circumferential groove and a second surface portion positioned on the other side in the width direction, an angle between the first surface portion and the second surface portion is in a range of from 20 to 170 degrees in a plan view of the tread portion, wherein the plan view is a view along the tyre radial direction, each of the groove walls includes a plurality of groove wall protruding portions each protruding toward an inside of the circumferential groove from a groove wall reference surface defined as a surface along the tyre circumferential direction at a widest position of a groove width of the circumferential groove, each of the groove wall protruding portions has a first groove wall surface extending in a tyre width direction and a second groove wall surface having an angle with respect to the tyre width direction larger than that of the first groove wall surface, and each of the groove bottom protruding portions is formed symmetrical with respect to the center line of the circumferential groove in the plan view of the tread portion.

2. The tyre according to claim 1, wherein
each of the groove bottom protruding portions has a second groove bottom surface having an angle larger than that of the first groove bottom surface with respect to the tyre radial direction.

3. The tyre according to claim 2, wherein
each of the groove bottom protruding portions has a third groove bottom surface substantially parallel to the tread surface and connecting between an outer end in the tyre radial direction of the first groove bottom surface and an outer end in the tyre radial direction of the second groove bottom surface.

4. The tyre according to claim 2, wherein
the second groove bottom surface is inclined such that a protruding height thereof from the groove bottom reference surface increases as it goes from one side to the other side in the tyre circumferential direction, and the second groove wall surface is inclined such that a protruding amount from the groove wall reference surface decreases as it goes from the one side to the other side in the tyre circumferential direction.

5. The tyre according to claim 1, wherein
the first groove bottom surface includes a third surface portion positioned between the first surface portion and the second surface portion.

6. The tyre according to claim 5, wherein
the third surface portion is perpendicular to the center line of the circumferential groove.

7. The tyre according to claim 5, wherein
a length in the tyre width direction of the third surface portion is not more than 60% of a maximum distance in the tyre width direction between the first surface portion and the second surface portion.

8. The tyre according to claim 5, wherein
the third surface portion is formed by a curved surface, a flat surface, or a combination of a curved surface and a flat surface.

9. The tyre according to claim 1, wherein
the pair of the groove walls are formed symmetrical with respect to the center line of the circumferential groove in the plan view of the tread portion.

10. The tyre according to claim 1, wherein
a length in the tyre width direction of each of the first groove wall surfaces is not more than 20% of an interval between the first groove wall surfaces adjacent to each other in the tyre circumferential direction.

11. The tyre according to claim 1, wherein
an interval between the first groove wall surfaces adjacent to each other in the tyre circumferential direction is equal to an interval between the first groove bottom surfaces adjacent to each other in the tyre circumferential direction.

12. The tyre according to claim 1, wherein
each of the groove bottom protruding portions has a second groove bottom surface having an angle larger than that of the first groove bottom surface with respect to the tyre radial direction, and
in the plan view of the tread portion, the first surface portion and the second surface portion are inclined to an opposite side to each other with respect to the width direction such that they approach the second groove bottom surface as it goes from the respective groove wall toward the center line.

13. The tyre according to claim 1, wherein
the groove bottom protruding portions include first groove bottom protruding portions and second groove bottom protruding portions, and
in the plan view of the tread portion, each of the first groove bottom protruding portions has an intersection portion between the first surface portion and the second surface portion thereof positioned on the other side of the center line and each of the second groove bottom protruding portions has an intersection portion between the first surface portion and the second surface portion thereof positioned on the one side of the center line.

14. The tyre according to claim 13, wherein
the first groove bottom protruding portions and the second groove bottom protruding portions are arranged alternately in the tyre circumferential direction.

15. The tyre according to claim 1, wherein
a height in the tyre radial direction of each of the first groove bottom surfaces is not less than 1 mm.

16. The tyre according to claim 1, wherein
the second groove wall surface is inclined with respect to the groove wall reference surface.

17. A tyre comprising a tread portion including a tread surface which is to be in contact with a ground during running, wherein
the tread portion is provided with a circumferential groove extending continuously in a tyre circumferential direction,
the circumferential groove has a groove bottom and a pair of groove walls extending from the groove bottom to the tread surface in a tyre radial direction,
the groove bottom includes a plurality of groove bottom protruding portions protruding outwardly in the tyre radial direction from a groove bottom reference surface defined as a surface parallel to the tread surface at a deepest position of a groove depth of the circumferential groove, each of the groove bottom protruding portions has a first groove bottom surface extending in the tyre radial direction, the first groove bottom surface includes a first surface portion positioned on one side in a width direction of the circumferential groove of a width-wise center line of the circumferential groove and a second surface portion positioned on the other side in the width direction, an angle between the first surface portion and the second surface portion is in a range of from 20 to 170 degrees in a plan view of the tread portion, wherein the plan view is a view along the tyre radial direction, each of the groove walls includes a plurality of groove wall protruding portions each protruding toward an inside of the circumferential groove from a groove wall reference surface defined as a surface along the tyre circumferential direction at a widest position of a groove width of the circumferential groove, each of the groove wall protruding portions has a first groove wall surface extending in a tyre width direction and a second groove wall surface having an angle with respect to the tyre width direction larger than that of the first groove wall surface, and the groove bottom protruding portions are each formed over an entire width in the tyre width direction of the circumferential groove.

\* \* \* \* \*